United States Patent
Sriram et al.

(10) Patent No.: US 6,226,315 B1
(45) Date of Patent: May 1, 2001

(54) SPREAD-SPECTRUM TELEPHONY WITH ACCELERATED CODE ACQUISITION

(75) Inventors: Sundararajan Sriram; Srinath Hosur, both of Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/067,594

(22) Filed: Apr. 27, 1998

Related U.S. Application Data

(60) Provisional application No. 60/077,246, filed on Mar. 9, 1998.

(51) Int. Cl.[7] .................................................. H04K 1/00
(52) U.S. Cl. ............................ 375/140; 375/145; 375/149; 370/342
(58) Field of Search .................................... 375/130, 140, 375/141, 142, 143, 145, 146, 149, 147, 150, 152; 370/331, 332, 334, 915, 335, 342; 455/403, 422, 436, 455, 515, 516

(56) References Cited

U.S. PATENT DOCUMENTS

| | | | |
|---|---|---|---|
| 5,910,948 | * | 6/1999 | Shou et al. ........................... 370/335 |
| 5,930,366 | * | 7/1999 | Jamal et al. ........................... 380/48 |
| 6,018,667 | * | 1/2000 | Ghosh et al. ........................ 455/502 |

OTHER PUBLICATIONS

K. Higuchi et a, "Fast Cell Search Algorithm in DS–CDMA Mobile Radio Using Long Spreading Codes", IEEE, 1997.*

* cited by examiner

Primary Examiner—Stephen Chin
Assistant Examiner—Chieh M. Fan
(74) Attorney, Agent, or Firm—Ronald O. Neerings; Frederick J. Telecky, Jr.

(57) ABSTRACT

The present application discloses an improved mobile communications architecture, in which each base station broadcasts not only data which has been spread by that station's long code word, but also (intermittently) code identification data which has not been spread. The code identification data is a block code which includes multiple symbols, so that multiple intermittent transmissions are required to complete the transmission of the code identification data. This transmission lets the mobile station shorten the search for the base station's long code word in two ways: the code identification data gives at least some information about the long code itself; and the phase of the block code gives at least some information about the phase of the long code word.

17 Claims, 3 Drawing Sheets

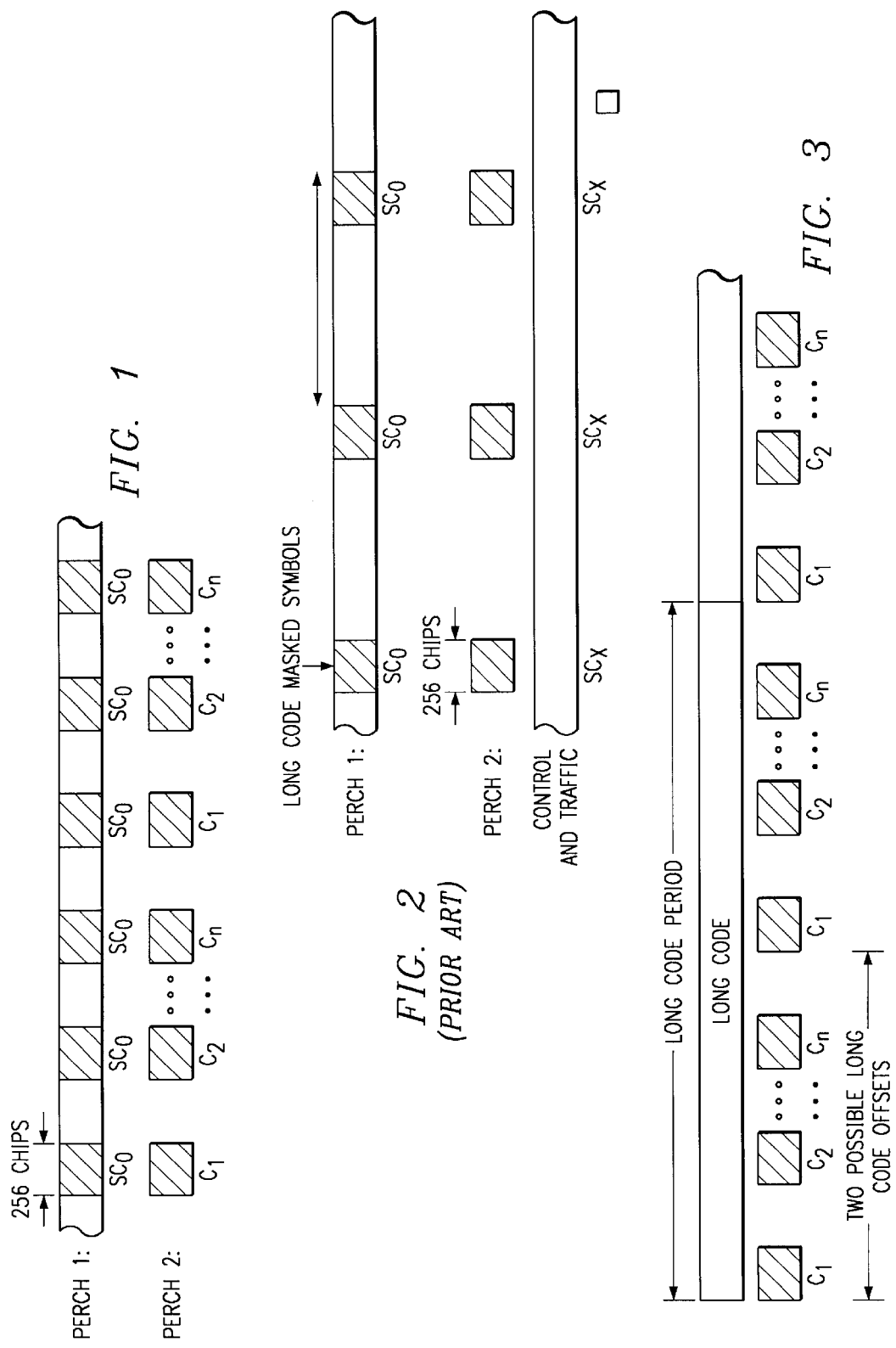

SPREAD-SPECTRUM TELEPHONY WITH ACCELERATED CODE ACQUISITION

CROSS-REFERENCE TO RELATED APPLICATION

This application claims priority from Provisional Application 60/077,246 filed Mar. 9, 1998, which is hereby incorporated by reference. However, the content of the present application is not identical to that of the priority application.

BACKGROUND AND SUMMARY OF THE INVENTION

The present invention relates to wireless telecommunications systems which use spread-spectrum methods.

Background: Spread-Spectrum Methods

One of the most important tools in telecommunications is spread spectrum methods. For example, in a direct-sequence spread-spectrum ("DS-SS") transmission, the signal is modulated by a code word which is known to both the transmitter and receiver. (The code word is merely a long pseudo-random bit sequence, that is, a sequence of bits which appears random but is determined by the input to a generator and is, therefore, reproducible. The sequence is generated identically, at both the transmitter and receiver, by custom hardware.) At the receiving end, digital filtering methods can be used to selectively recognize only the signals which are encoded with the expected pseudo- random bit sequence. Since the code word is used to separate signals which share the same spectrum space, these methods are also known as CDMA (code-division-multiple-access). To distinguish between the bits of the code word and the bits of data, the bits of the code word are referred to as "chips." The chip rate is usually much faster than the bit rate.

The term "spread spectrum" is also used to refer to two other techniques: "frequency-hopping" systems, in which the transmitter frequency changes in some way which the receiver can predict; and "chirp" modulation or Pulse-FM in which a carrier is swept over a wide band during a given pulse interval. Frequency-hopping systems are less important for civilian telecommunications.

CDMA methods are commonly used in cell phone systems. In such a system, adjacent base stations must have different spreading sequences (long pseudo-noise or "PN" codes), and the mobile unit must be able to lock onto the correct long code (spreading sequence) for each base station it may interface to. The mobile unit will already know the set of possible long codes which it may encounter, but will not know a priori which long code it will encounter when switched on. In most systems the mobile unit will also not know what the received long code offset is, that is, the timing of the transmission of the long code is not known. However, it is highly desirable for the mobile unit to acquire the received long code quickly. This is an essential step in the handoff from one base station to another. Base station handoff is particularly a problem as the number of base stations becomes larger.

Thus the acquisition of the long code during initial acquisition or handoff is a critical bottleneck. A technique for accelerating this has been proposed in the NTT DoCoMo ("Nippon Telegraph & Telephone Mobile Communications Network, Inc.") System. In this system, each base station transmits a signal on a "pilot" (or "perch") channel which helps the mobile system to acquire the correct long code for that base station.

The DoCoMo System

The DoCoMo System introduced some features to make the PN acquisition of the long code simpler. In the DoCoMo system, PN acquisition is accomplished by intermittently broadcasting a symbol which is not encoded by the base station's long code.

Thus, a mobile receiver can simply search for the particular short code ("SC0") which is shared by every base station. When the mobile unit finds this short code, SC0, it can also look to see which of the short codes SCk is being broadcast synchronously with the SC0 code. The SCk code will show which group of transmitters the base station belongs to. The receiver then uses this information to shorten its search through the complete set of codes. Once this information has been acquired, there are still two ambiguities which must be resolved: the receiver must still identify which long code, within the reduced group of possible long codes, is being broadcast; and the receiver must still determine the phase of the long code.

That is, within the timing architecture of the DoCoMo system, a long-code-masked symbol is broadcast once in every ten symbols. Since there are 160 symbols in the complete long code, the long-code-masked symbols will be broadcast 16 times before the long code has repeated once. Thus in the DoCoMo system the receiver has to discover which of the 16 repetitions of the short code (within the long code period) has been detected. (Since it is not known which long code is being used, it is necessary to check all possible phases of the reduced set of possible long codes.) See Higuchi et al., "Fast cell search algorithm in DS-CDMA mobile radio using long spreading codes," 1997 IEEE 47th Vehicular Technology Conference vol.3 pp.1430–4, which is hereby incorporated by reference.

Spread-Spectrum Telephony with Accelerated Code Acquisition

The present application discloses an improved mobile communications architecture, in which each base station broadcasts not only data which has been spread by that station's long code word, but also (intermittently) code identification data which has not been spread. The code identification data is a block code which includes multiple symbols, so that multiple intermittent transmissions are required to complete the transmission of the code identification data. This transmission lets the mobile station shorten the search for the base station's long code word in two ways: the code identification data gives at least some information about the long code itself; and the phase of the block code gives at least some information about the phase of the long code word.

This advantageously results in a system where the amount of searching which a mobile unit must do to acquire the correct code for a new base station is greatly reduced. This results in the further advantage of faster acquisition of a new base station during hand off.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 1 depicts the disclosed method of code based acquisition.

FIG. 2 depicts the current NTT DoCoMo channel structure.

FIG. 3 depicts a block code of n=8.

DETAILED DESCRIPTION OF THE PREFERRED EMBODIMENTS

Figure 4:
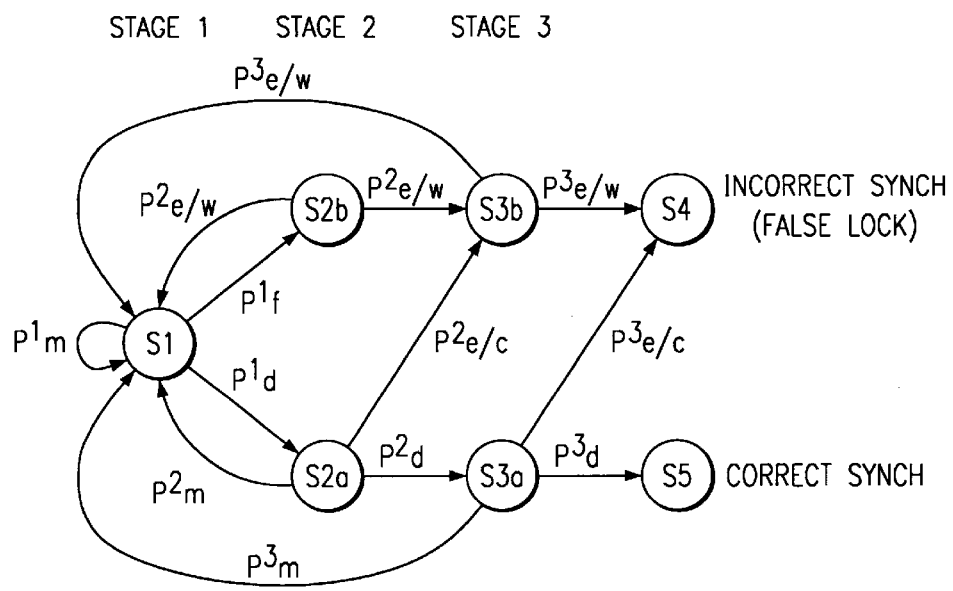
FIG. 4 depicts a state diagram for the 3 stage search.

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Definitions

Following are some of the technical terms used in the present application:

Block Code: A code in which each code includes multiple symbols (or words).

Bose-Caldwell technique: Procedure for generating a subset of comma free words from an arbitrary cyclic code.

CDMA: Code-Division Multiple Access.

Comma-Free: A code word which does not have internal repetition, i.e. which cannot be overlaid onto itself by any shift smaller than the length of the code word.

CSC: Common short code.

Doppler Shift: The difference between transmitted frequency and received frequency which is caused by a relative velocity between transmitter and receiver.

Fingers: Search correlators which can operate in parallel.

Galois Field: A field of finite order.

Gaussian Noise: Noise which displays a bell-curve distribution around a center frequency.

Gold Codes: A particular type of PN having good cross-correlation and good auto-correlation properties for CDMA use.

Long Code: A pseudo-noise spread indicator with a long period, e.g., 40960 chips.

M-Sequence set: A sequence of maximum possible length generated by a linear feedback shift register having certain properties such as balance, shift and add, and correlation.

Markov Chain: A transition graph for a state machine illustrating the Markov process of probabilities.

NTT DoCoMo: Nippon Telegraph & Telephone Mobile Communications Network, Inc.

Orthogonal Gold Codes: Gold codes with error-detecting and correcting properties.

Pseudo-noise ("PN"): A noise-like waveform generated using pseudo-random numbers.

Pseudo-random Bit Sequence: A sequence of bits which appears random but is determined by the input to a generator and is, therefore, reproducible.

Rayleigh Fading: A standard model for signal fading.

Reed-Solomon code: A category of block, non-binary, error-correcting codes with excellent distance properties.

Signal-to-Noise Ratio (SNR): A ratio of the signal level received by a station to the background noise.

SIR: Signal-to-Interference Ratio.

Sliding Window Correlation: Technique used to find the location of a particular code. The time at which the received code is sampled and compared is shifted until a correlation is found.

Spreading Sequences: long codes used to indicate pseudo-noise sequence information.

Symbol: A code of a particular length. Together with other symbols, an alphabet is formed.

Syndrome Polynomial: Equation expressing the locations of errors or shifts in the transmitted code.

Walsh Sequence: Orthogonal codes used in cellular CDMA systems.

WCDMA: Wideband CDMA.

Overview

The present application discloses inventions which can be used to provide an improvement on the DoCoMo system. As in the DoCoMo system, a long-code-masked symbol common to all base stations, SC0, is broadcast repeatedly. However, instead of a single repeated symbol being combined with the universal short code symbol, a longer code is broadcast, symbol by symbol, on the second long-code-unmasked channel. Each symbol of this longer code can easily be recognized by the mobile receiver. For example, if the short codes on the second perch channel are each permitted to have one of four values, as in the DoCoMo system, and eight symbols are used for the block code, then in principle it would appear that 16 bits of information could be transmitted on the second perch channel. However, the presently preferred embodiment does not actually encode this many possibilities on the second channel, since the preferred coding also tells the receiver the phase of the code being received. This is accomplished by using "comma-free" block codes.

The term "comma-free," in this application, is used to refer to sequences which are not internally repetitive. For example, for blocks of eight symbols, each of which can have four values, the following blocks all contain internal repetitions, and are not comma-free: AAAAAAAA or BBBBBBBB (repeats with a shift of one); ABABABAB or CDCDCDCD (repeats with a shift of two); ABCDABCD or CDAACDAA (repeats with a shift of four).

As will be shown below, the comma-free property does not greatly reduce the number of possible block symbols. However, it provides important additional information.

The receiver knows what block codes are possible. Thus by looking at the sequence of symbols on the second perch channel, the receiver can hear the block code being sent out by the received base station. Once the receiver hears enough symbols to make up a complete block code, it immediately derives two important pieces of information. First, the mobile station has obtained far more specific information about the base station's long code word than is possible in the DoCoMo system.

Second, the receiver has eliminated the phase ambiguity due to the number of repetitions of the universal code within one repetition of the long code. Again, to take a simple example, where the long code contains 16 repetitions of the unmasked universal code, the DoCoMo system requires that 16 different shift positions must be tried out for each long code candidate. By contrast, the use of a comma free block code reduces the ambiguity in shift positions. In the simple example given, if the block code is of length eight, then once a block code has been recognized there are only two possible shift positions for the long code. This greatly reduces the amount of searching required.

To take another example, forming eight-symbol blocks using an alphabet of four symbols, the raw number of possible blocks is $4^8$ (four to the eighth, or 65,536). Removing the codes which are not comma-free requires removal of $4^4$ (256) codes (since any code which repeats under a shift of one or two will also repeat under a shift of four). The remaining total of 65280 comma-free codes is divided by eight, since each possible shift of these codes will still appear. This yields 8160 unique comma-free blocks, which is still a. large number.

Thus there is a tradeoff in the length of the block code. A longer block code will greatly increase the specificity with which the long code is identified. (For long block codes, such as a block code of length eight with an alphabet of four symbols, it may be possible to uniquely identify the long code.) However, the longer the block code used, the more time is required for the mobile station to acquire all the symbols of the block code. Further, the greater the number of code words or symbols used, the greater the complexity of the acquisition search.

For example, using the simple example above of an alphabet of four symbols and a long word which contains 16 long-code-masked symbols, and a set of 128 long codes, the set of comma-free block codes of length eight is far more than necessary to uniquely identify one of the 128 long codes. Thus the number of cases which must actually be searched is two (one long code with two possible shifts). Alternatively, if a block code of length four were used in the system, the number of comma-free block codes would be exactly $4^4$-$4^2$, or 240. Here too the information in the block code is more than enough to uniquely identify one of 128 possible long codes. In this case the number of ambiguities in the phase of a long code is four (16 divided by 4), so that the number of long code possibilities is only four.

Of the large number of comma free code words, only a small subset of these code words is chosen (e.g., only 64 of the length of code words for the (8,3) R.S. code example). This is done so that the chosen code words have a large minimum Hamming distance. This will improve performance since the chance that the receiver will misidentify one code word for another becomes smaller with a larger minimum distance. Reed-Solomon codes provide a method for deter- mining a set of code words with a large minimum distance. Preferably the codes used are chosen to minimize confusion. As discussed below, Reed-Solomon codes are particularly advantageous for this. Although originally designed as error-correcting codes, the comma free properties of Reed-Solomon codes make them particularly useful for code based acquisition purposes.

Detailed Description

The presently preferred embodiment is contemplated as an improvement to the DoCoMo system. However, of course other implementations of the innovative ideas are possible.

The preferred embodiment of the present disclosure is a method for sending information about the PN sequence over the perch channel in a CDMA system. This method pertains to situations where base stations (BS) are not synchronized, so that each BS uses a different spreading sequence (that is "long code"). In such a case, the mobile station (MS) must first determine the code being used by the BS from which the mobile receives sufficiently strong signals. To improve acquisition time, markers consisting of a short (e.g. 256 chip) Gold code are transmitted periodically. Gold codes have good cross-correlation properties, which keep adjacent channel interference small, and good auto-correlation properties, which support easy receiver synchronization. This short code marker is called SC0. Also, the entire set of possible long codes is divided into groups, 1 through N. To facilitate acquisition, the group identifier is also transmitted over the perch channel. One scheme that is used currently sends one of N orthogonal Gold codes (SC1 through SCN), that is, a gold code with certain error-correcting and cancellation properties, over the perch channel as a group identifier, such that the markers SC0 and the group identifiers overlap in time.

To achieve synchronization, the mobile first determines the location of SC0, and then finds out which of SC1 through SCN is being received, thereby determining the long code group. However, since there are many long codes per group, the mobile still has to perform a lengthy search to determine the exact long code being used.

Figure 6:
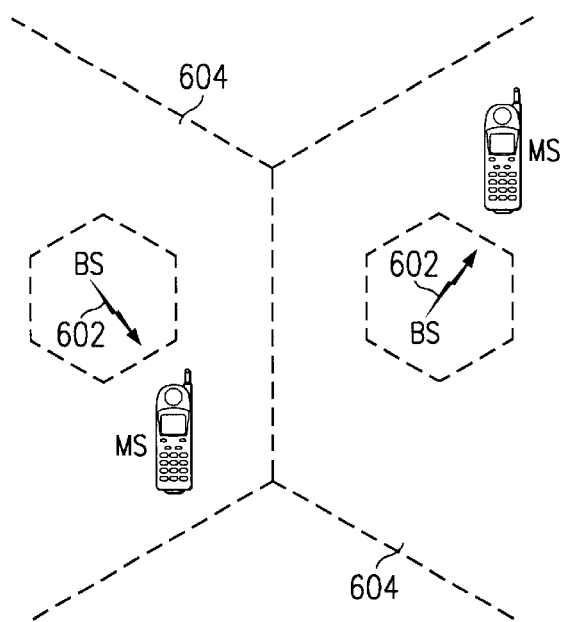
FIG. 6 depicts a wireless communications system with many mobile stations and many base stations.

The disclosed method alleviates such lengthy searches by sending an (n, k) block code over the perch channel, instead of repeatedly transmitting the group code. The k data symbols of the code encode the long code sequence ID. Since the block code is sent repeatedly, it has to have the comma-free property, i.e. cyclic shifts of every code- word must be unique. This property ensures that the code can be uniquely decoded, once n contiguous symbols of the code are collected from the perch channel. An error correcting code such as a Reed- Solomon code, with an alphabet made of the N Gold codes, is used for the block code. The MS uses soft-decision decoding to obtain the long code ID; the large minimum distance provided by the block code results in an equivalent diversity gain. In addition, the mobile can also determine the exact cyclic shift of the code-word since a comma-free block code is used. This cyclic shift information can be used to determine the long code phase; this is needed if the markers are transmitted more than once in one period of the long code, resulting in an ambiguity in the starting point of the long code with respect to the marker positions. FIG. 6 depicts a wireless communications system in which mobile stations (MS) which have acquired signals from base stations (BS). A base station is located at the center of each cell 604. The path of the BS signal to the MS which has acquired it is indicated by the directional signal arrows 602. The MS acquires the BS signal of the BS signal which is subject to the least amount of path loss while propagating to the MS.

The advantages of this method stem from the fact that the number of long codes the mobile has to search through is reduced, resulting in:

1. a reduced acquisition time for a given amount of hardware; and
2. a larger order of diversity combining being employed, thus the perch SNR required to get acceptable acquisition performance can be reduced. This implies lesser interference, and increased system capacity.

The disclosed method, using comma-free code-words from an (8.3) Reed Solomon code over GF(17), at 0 dB average pilot SNR, for Rayleigh fading with 80 Hz Doppler Shift, yield an average acquisition time about 1 second, which is less than one third of the acquisition time for the existing group code based method.

Background: NTT DoCoMo

FIG. 2 depicts the NTT DoCoMo channel structure. In the currently used NTT system, symbols for the traffic and control channels are spread by a "long code" that has a period of 40960 chips and is chosen from an "M-sequence" set. The set is essentially two maximal length shift register sequences that are shifted relative to one another and Xored together.

Each BS uses a separate long code, with the possibility of code reuse between BSs that are geographically far apart. The total set of L long codes is divided into N groups consisting of LIN long codes each. The current NTT spec uses L=128, and N=4. These sets of long codes have good autocorrelation properties, and low cross-correlation.

In order to facilitate the acquisition process in the NTT system, two so called "perch" channels are provided. Each perch channel has one "long code masked symbol," which is essentially a marker that appears periodically every 625 ms. As the name suggests, these marker symbols (a 256 chips long Gold code in the NTT spec) are not spread by the long code, and are common to all base stations. The long code masked symbol on the first perch channel is referred to as "SC0." The first perch channel consists of other 256 chip symbols that are not masked and are used in the final stage of the PN acquisition process. The traffic and control channels are spread using the same long code, but they are also multiplied by a 256 chip orthogonal Walsh sequence, and hence cancel out when the perch 1 channel is despread. For this reason, traffic channels can be ignored for the acquisition problem; however these do have to be taken into account when the interference energy in the perch channel is calculated, because the traffic channels appearing in delayed multipath components of the received signal are no longer orthogonal to the perch channel.

The second perch channel consists of only one symbol that is long code masked, and appears periodically every 625 ms, and overlaps SC0 in time. This symbol encodes the long code group, and hence there are one of N different long code masked symbols (call them SC1 to SCN) on the second perch channel. In the current NTT proposal, SC0 through SCN are chosen from a set of 256 chip "short" Gold codes.

Figure 5:
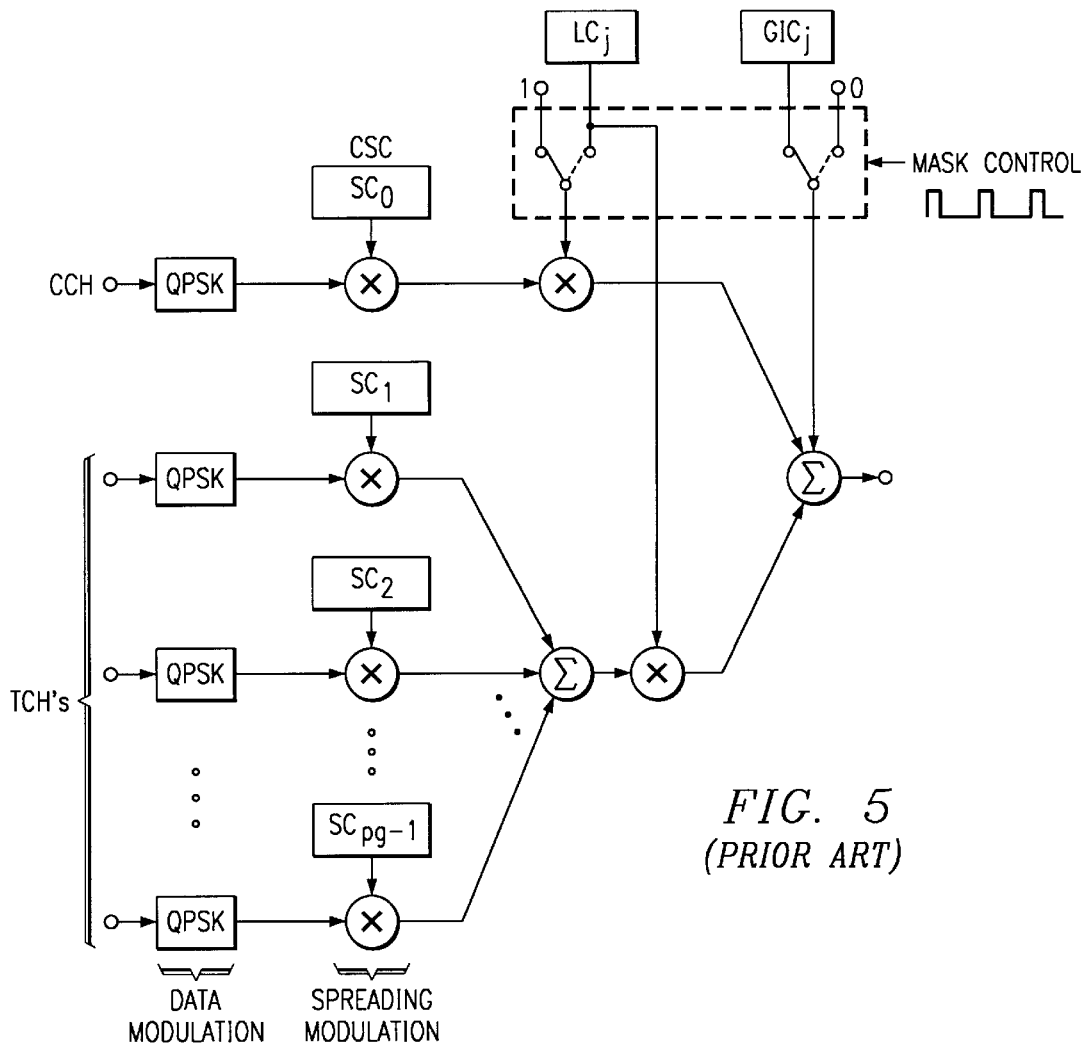
FIG. 5 depicts the transmission structure of a base station cell.

FIG. 5 depicts the transmission structure of a base station cell. Data on the control channel (CCH) is modulated by a Quadrature Phase Shift Keying (QPSK) module. The signal is then spread by a combination of a cell site-unique long code ($LC_j$) and the CSC (common short code) common to all cell sites. However, the long code sequence is periodically masked over one data symbol interval (or short code length) by a long code group identification code ($GIC_j$) identifying the group to which the long code of each cell belongs. $\{SC_0, SC_1, \ldots, SC_{pg-1}\}$ is the full set of orthongonal short codes and $SC_0$ is the short code assigned to CSC while the other codes are assigned to the traffic channel (TCH). One of these short codes, other than $SC_0$, is reused as the GIC. Two sequences are used to generate the spreading code of the j-th cell site. The first is generated by loading a generator shift register with all "1"s. The other is generated by loading a generator shift register with a binary representation of a j, where a is the shift constant unique to each cell site. The long code, $LC_j$, is generated as $LC_j=PN_1("1"s)\oplus PN_2("a\cdot j")$, where $\oplus$ is a modulo-2 sum operation. The $GIC_j$ representing $LC_j$ is determined as $GIC_j=SC_{(j \bmod A)+1}$, where A ($\leq pg-1$) is the number of long code groups, each group containing 1/A times the total number of long codes used in the system.

The PN acquisition process can be divided into three stages:

Stage 1: The receiver first determines the location of SC0 (by performing a sliding window correlation of a locally generated replica of SC0 with the received signal, and detecting a correlation peak at the SC0 location).

Stage 2: The receiver determines the long code group by detecting which one of SC1 to SCN has been transmitted on top of SC0 (this is done by correlating the received signal with each of SC1 through SCN at the marker positions deter- mined in Stage 1).

Stage 3: Since each group consists of L/N long codes, the receiver further searches through these possibilities. In addition, since the masked symbols appear once every 625 ms and the period of the long code is 10 ms, 16 masked symbols appear in every period of the long code. As a result, the masked symbol detected may be aligned with any one of 16 offsets of the long code. Thus there is a total of 16 (L/N) searches in Stage 3, each search consisting of a correlation of the received signal with a code of appropriate offset; this search is done on the unmasked long code portion of perch 1.

The current search process, especially Stage 3, is clearly very lengthy, implying a large acquisition time at the receiver, unless a large amount of hardware is employed. Allocating f search "fingers"—correlators performing the search in parallel—to stage 3, the number S of symbol intervals required to complete the search is:

$$S=\lceil 16L/(fN) \rceil$$

This assumes that each possible long code and offset is correlated against the received signal for one symbol interval (i.e. no diversity is employed), and that each finger operates at symbol rate, producing one correlation output every symbol interval.

Using 16 "fingers," L=128, and N=4, this search consumes 32 symbol intervals; this is nearly 4 time slots, since there are 9 unmasked symbols per time slot on perch 1. Using 512 fingers would cut this time to only one symbol. However, the overhead of 512 search fingers make this option impractical.

Code Based Acquisition

FIG. 1 depicts the disclosed method of code based acquisition. The disclosed method alleviates the problems of the current method by dividing the set of long codes into a larger number of groups, and transmitting correspondingly more group information on the second perch channel. The current NTT scheme transmits one of SC1 to SC4, i.e. 2 bits of information, over perch 2. Instead of repeatedly sending a group code that is one symbol long on Perch 2, the disclosed method uses a block code of length n over an alphabet consisting of q symbols as the group code. This corresponds to sending the sequence of symbols $C_1 C_2 \ldots C_n$, where each $C_1$ is one of the Gold codes SC1 through SCq.

Several bits of group code information can be encoded by means of such a repeating block code. N is larger (to encode N groups requires $\{\log(N)\}$ bits), and so the number of long codes to be searched in stage 3, L/N, is smaller.

Comma Free Codes

The offsets of the long code can also be encoded in the block code using comma free codes. Since the block code is transmitted repeatedly, the receiver may get an arbitrary cyclic shift of the block code $C_1 C_2 \ldots C_n$. Each code word is characterized by its period, which is defined as the number of cyclic shifts of the code word that are unique. For example, for a binary code, an all one or an all zero code word has period of 1 whereas an alternating 0–1 sequence will have period 2. Clearly, for a lengthy code, e.g., of length n, there will be some code words that have period n, i.e. all n cyclic shifts of the code word (corresponding to cyclic shifts of 0 through n–1) will be unique. If a code word of length n has a period p, then p divides n. Thus, if n is a prime, then the only periods possible are 1 and n. For example, for all binary sequences of length 3: {000, 111 } have period 1, and the other 6 sequences {100, 010, 001, 110, 101, 011} each have period 3.

For the purpose of long code identification, the period of a code word has a relationship to the number of bits of information it carries. This is because the unique cyclic shifts of a code word can be used to encode the possible offsets of the long code. For this to be true, however, the length of the code word n must divide the number of possible offsets of the long code with respect to the long code masked symbol locations, 16 in this example. FIG. 3 depicts a block code of n=8.

The symbol $C_1$ of the code word can be synchronized to start at the beginning of the long code period. If only code words that have all 8 unique cyclic shifts (i.e. have a period 8) are used, then the receiver only needs to look at two possible offsets of the long code. On the other hand, code words with periods smaller than 8 encode lesser information: a period of 4 implies an offset ambiguity of 4, and these 4 offsets still need to search. An example of a length 8 binary code word that has period 4 is 10111011.

Thus, for the purpose of designing a block code for sending the long code information, the block length n should be a factor of, in this example, 16. Choosing n to be a multiple of 16 would also work, but it would adversely affect acquisition time, because the receiver must expend n time slots just to collect all the symbols from the code word. Also, since code words with period n encode the most information, only such code words will be used.

Unique Cyclical Shifts

For an n-tuple over a q-ary alphabet, if $n=p_1^{l_1}p_2^{l_2} \ldots p_g^{l_g}$ (where $p_1, p_2, \ldots, p_g$ are prime) is the unique prime factorization of n, then the number M of n-tuples over a q-ary alphabet that are comma-free is given by the following expression:

$$M = q^n - \sum_{i=1}^{g} q^{n/p_i} + \sum_{1 \le i < j \le g} q^{n/(p_i p_j)} - \sum_{1 \le i < j < h \le g} q^{n/(p_i p_j p_k)} + \ldots + (-1)^g q^{n/(p_1 p_2 \cdots p_g)}$$

Since the above M code words comprise the set of all code words that have n unique cyclic shifts, they can be divided into M/n disjoint classes, with each class containing all the cyclic shifts of a particular code word i.e. M/n unique groups. The equation above illustrates that a large percentage of the $q^n$ n-tuples are in fact comma free: the subsequent terms are exponentially smaller than the first term.

As a special case of the above equation, consider where $n=p^1$ is a prime, then $M=q^n-q^{n/p}$. For example, if n=4, and q=2, then there are 12 comma free codes: {0001, 0010, 0100, 1000, 0111, 1011, 1101, 1110, 1001, 1100, 0011, 0110}. The 3 classes consisting of codes that are cyclic shifts of one another are: {0001, 0010, 0100, 1000}, {0111, 1011, 1101, 1110}, and {1001, 1100, 0011, 0110}. Thus, there are three unique groups.

Using any one code word from each of the M/n classes, up to M/n long code groups can be encoded. In addition, since the code words are comma free and n is chosen to divide, in this example, 16, only 16/n offsets need to be searched. The number of symbol intervals required in stage 3 to complete the search (without any diversity combining) for the comma free code based approach is:

$S=[16L/(fnN)]$.

Note, had a code length that does not divide 16 been used, symbol intervals would be required. On the other hand, if n does divide 16, but a comma free code is not used, then each code word carries a different amount of information depending on its period, complicating decoding.

Simple Comma Free Code of Length 2

A total of 512 long codes (L=512) are assumed. Instead of a single symbol group code, an n=2 comma free code can be employed. If q=16 is chosen, M/n results, whereas q=17 gives M/n=136. Thus 7 bits using an alphabet set of size 17 can be encoded, which encodes 128 long code groups (N=128), each containing 4 long codes. If short codes SC1 to SC17 are used as the alphabet for the length 2 code described above, code words will be 128 ordered pairs of the form (SC1, SC2), (SC1, SC3), etc. If (SCi, SCj) is chosen as a code word, then (SCj, SCi) is not used as a code word. Also, for each code word (SCi, SCj), i is not equal to j for the comma free property to hold. The first element of each code word is aligned to the start of the long code period, as shown in the example of FIG. 3. The receiver receives both cyclic shifts of each code word on perch 2. The acquisition task at the receiver now is again divided into 3 stages:

Stage 1: Same as before

Stage 2: The receiver determines which of (SCi, SCj) is sent by the transmitter on perch 2. This is done by correlating with SC1 through SC17 at two consecutive masked symbol positions. For diversity several odd and even decision variables can be combined to make a final decision. The code word (SCi, SCj) tells the receiver which one of the 128 groups is being sent; also, since for a given code word (SCi, SCj) only one of SCi or SCj is aligned with beginning of the long code, the receiver needs to search through only 8 offsets in stage 3.

Stage 3: Since each group consists of 4 long codes, with an offset ambiguity of 8, a total of 32 combinations need to be searched.

Thus, using 16 correlator fingers in the above equation, only two symbol periods are needed to search through all the possibilities; correlation can now be performed over a large number of symbols to improve the overall Stage 3 performance (in terms of miss and false alarm probabilities). Using 4 time slots, a diversity of 18 in stage 3 can be achieved.

Error Correcting Codes

Code diversity can be exploited by taking comma free codes a step further by using error correcting block codes to send long code information on perch 2. Reed Solomon codes yield not only the benefits of a small search space as indicated before, but also improved performance in the second stage of acquisition thanks to the error correcting property of the code.

An error correcting code achieves its useful properties because it is designed such that all its code words have a certain minimum distance between them; a t error correcting code has minimum distance 2t+1. All cyclic shifts of each code word are also received at the receiver. Thus a code in which all cyclic shifts of a code word are also code words is needed. In other words, a cyclic code is needed. This is of course not a problem because a significant body of coding theory literature in fact deals with cyclic codes.

Any error correcting cyclic code with block length n that divides, e.g., 16 can be used for the purpose of long code identification. Comma free code words from such a code must be chosen, i.e. the code words that have n unique cyclic shifts, are used to encode the long code group.

Since a set of Gold codes can be used as the alphabet for the block code, a large alphabet set size can be employed, such as q=17. This makes Reed Solomon (RS) codes preferred for the purpose of the disclosed method, since these codes require the alphabet set size to be large. Also, a Reed Solomon code meets the singleton bound: a (n,k) RS code has minimum distance $d_{min}=n-k+1$, and this is the maximum possible $d_{min}$ for any (n,k) cyclic code.

Counting Comma Free Code Words

Given that n divides q−1, an (n,k) RS code can be constructed over GF(q), i.e. a Galois field of order q. Suppose α is the primitive element in GF(q), and that β=α

$$\beta = \alpha^{\frac{q-1}{N}}.$$

An RS code (n,k) can be constructed by using a generator polynomial with the roots $\beta^c$, $\beta^{c+1}$, $\beta^{c+n-k-1}$.

The value c is arbitrary and is normally chosen to be 1. However, for maximizing the number of comma free code words in the generated code, the optimal value for c is in fact 0. Thus an (n,k) RS code C is constructed using a generator polynomial with the roots $1, \beta, \beta^2, \ldots, \beta^{n-k-1}$.

As above, let $n=p_1^{1_1} p_2^{1_2} p_g^{1_g}$, where $p_1, p_2, \ldots, p_g$ are prime, be the unique prime factorization of n. Then, the number of code words in C that are comma free is given by:

$$M = q^k - \sum_{i=1}^{k} q^{\lfloor k/p_1 \rfloor} + \sum_{1 \leq i < j \leq g} q^{\lfloor k/(p_i p_j) \rfloor} - \sum_{1 \leq i < j < h \leq g} q^{\lfloor k/(p_i p_j p_k) \rfloor} + \ldots + (-1)^g q^{\lfloor k/(p_1 p_2 \cdots p_g) \rfloor}$$

When compared to the above equation for n-tuples over a q-ary alphabet, a large proportion of the $q^k$ code words in the RS code are seen to be comma free. However, if the roots of the generator polynomial of the code are stated to be $\beta^c$, $\beta^{c+1}, \ldots, \beta^{c+n-k-1}$ such that c is not equal to 0, then the number of comma free code words reduces to:

$$M = q^k - \sum_{i=1}^{k} q^{\lceil k/p_1 \rceil} + \sum_{1 \leq i < j \leq g} q^{\lceil k/(p_i p_j) \rceil} - \sum_{1 \leq i < j < h \leq g} q^{\lceil k/(p_i p_j p_k) \rceil} + \ldots + (-1)^g q^{\lceil k/(p_1 p_2 \cdots p_g) \rceil}$$

A procedure, the Bose-Caldwell technique, for generating a subset of comma free code words from an arbitrary cyclic code given the generator polynomial for that code, has been derived. See W.W. Peterson and E. J. Weldon, ERROR CORRECTING CODEs 374–91 (1972). Applying the procedure to RS codes, any (n,k) RS code will generate $nq^{k-1}$ comma free code words; thus $q^{k-1}$ long code groups can be encoded using these code words. In other words the comma free property can be achieved by giving up one information symbol. However, it can be shown that there are in fact more comma free code words in a given RS code than the $nq^{k-1}$ code words obtained by the Bose-Caldwell technique.

The Bose-Caldwell technique has another property in that given cyclic shifts of the generated code words, a syndrome polynomial can be constructed that uniquely determines the cyclic shift. Thus during decoding the receiver avoids comparing all the cyclic shifts of the received code word to each of the possible transmitted code words. However, to get the most out of the code based approach, soft decision decoding of the RS code at the receiver is required. Although using soft decoding means the efficient decoding techniques available both for regular decoding of the RS code as well as for determining the cyclic shift cannot be used, complexity is not a problem for the short length (n=8) RS codes being considered.

Reed Solomon Code Comma Free Code Words

For the code based acquisition scheme the block length n that divides, e.g., 16, is chosen. RS codes over GF(17) are most suitable for this, since these codes have block length that divides 16. The (8,2) code has M=272 comma free code words (found by machine search, as opposed to only 136 code words generated by the Bose-Caldwell technique). Therefore, M/n=34 long code groups can be encoded with such a code.

Instead of the (8,2) code, the (8,3) code, which can be used to encode more information is preferred, even though it has $d_{min}=6$. A primitive element in GF(17) is 3. Thus, if the generator polynomial is:

$$g(X)=(X-1)(X-9)(X-9^2)(X-9^3)(X-9^4),$$

M=173−17=4896 comma free code words are obtained. An interesting aside, though not of great consequence here, is that if $$g(X)=(X-9)(X-9^2)(X-9^3)(X-9^4)(X-9^5),$$

only $17^3-17^2=4624$ comma free code words are obtained.

The 4896 comma free code words in the (8,3) code (using generator g(X)) may be divided into 4896/8=612 classes of code words, each containing 8 cyclic shifts a code word. Thus up to 612 long code groups can be encoded using any one code word from each of these 612 classes. As an example, let the number of long code groups to be 64, using only a subset of the 612 classes. This choice is convenient for comparing the performance of the RS code based approach with the original NTT approach as well as with the simple length 2 code. Assume there are 512 long codes in the system, divided into 64 groups (N=64) leaving 8 long codes per group. The first symbol of each of these 64 code words is aligned to the start of the long code period, as in FIG. 3. The receiver receives every cyclic shift of each code word, a total of 64×8 code words in all. However, since it knows the particular cyclic shift that has been transmitted, it determines the start of the long code period, but for an ambiguity of 2 offsets.

Thus only 8 codes and 2 of their offsets need to be searched in stage 3. These 16 possibilities can be searched in parallel in one symbol interval using 16 fingers at the receiver. Then, the receiver can use a very high order of diversity, e.g. in 4 time slots it can use all 36 symbols that appear in those slots for the final search as well as for very accurate long code verification. Also, if required, a larger number of long codes can be supported by using more than 64 long code groups (up to a maximum of 612), while still requiring only 16 codes and offsets to be searched in stage 3.

To summarize, using the (8,3) code designed above, the following steps are performed by the receiver:

Stage 1: Same as before

Stage 2: The receiver determines which of the group codes $C_1 C_2 \ldots C_8$ is sent by the transmitter on perch 2, where each $1 \leq C_i \leq 17$, corresponding to one of the short codes SC1, SC2, . . . , SC17. This is done by correlating the received signal with SC1 through SC17 at eight consecutive masked symbol positions. For diversity every eighth decision variables may be combined to make a final decision (it would take 8d slots to get a diversity of a). The receiver may perform either hard or soft decoding of the received code word.

For hard decision decoding, the receiver simply determines the SCj that yields maximum correlation in each of the 8 consecutive slots. This determines each $C_1$, at which point the standard RS decoding algorithm can be used to correct up to 2 errors (since 2t=n−k=8−3). Which of the 64 code words the received word corresponds to can then be determined, either using the Bose-Caldwell approach, or by exhaustively comparing the received word with each of 8 cyclic shifts of each of the 64 code words. This is a simple task for a DSP. This yields the code word that was transmitted as well as the particular cyclic shift that was received.

For soft decision (maximum likelihood) decoding, the 8×17 results obtained from the correlation process are saved. Let $D_i$ be the result of correlating the received signal in the ith time slot ($1 \leq i \leq 8$ represents each of the 8 consecutive time slots) with the short code SCr, $1 \leq r \leq 17$. If diversity combining of order d is employed, then each $D^i$ represents the combined correlation value from the d time slots. Now, for each of the 8 cyclic shifts of each one of the 64 code words that may have been transmitted (512 candidates in all), the following decision variable is calculated:

$$\Lambda = \sum_{i=1}^{8} D\frac{i}{C_1}$$

where $\overline{C_1 C_2} \ldots \overline{C_8}$ are each of the 512 possible candidates, one of which is the received cyclic shift of the transmitted code word $C_1 C_2 \ldots C_8$.

The word $\overline{C_1 C_2} \ldots \overline{C_8}$ that maximizes $\Lambda$ is chosen, and in this search process, the cyclic shift of the received code word can also be determined. To do this efficiently, for each of the 64 code words $C_1 C_2 \ldots C_g$, calculate $\Lambda$ for it and its cyclic shifts, and store the maximum value of $\Lambda$ (out of 8 computed values) that is obtained, and also store the cyclic shift corresponding to this maximum. This is done for all 64 code words, in the end obtaining the most likely transmitted code word and also its received cyclic shift. The large minimum distance between the code words and their cyclic shifts reduces the probability of picking a wrong code word, i.e. provides code diversity.

For a length 8 group code, soft decision decoding using the brute force approach above is very feasible: it is estimated between 5–10 K DSP processor instruction cycles (e.g., the TMS320C54×DSP manufactured by Texas Instruments) to do the above calculation, assuming the correlation computation (for obtaining $D_r^i$) is done by hardware external to the DSP. Such dedicated hardware is needed for the current acquisition scheme also. For larger block lengths, which may arise in the future if a very large number of long codes is required, smarter soft decoding techniques will also be required.

Stage 3: Since each group consists of only 8 long codes with an offset ambiguity of 2, a total of 16 combinations need to be searched, as compared to 512 combinations in the NTT scheme, and 32 combinations needed if the simple length 2 comma free code or the (8,2) RS code is used.

Mean Time for Acquisition

The effect of the code based scheme on the average acquisition time can only be determined by examining all the acquisition stages together. Although there is a clear gain in Stage 3 of the acquisition process because of the reduced search space, more information is transmitted in Stage 2 (2 symbols instead of one for the n=2 code, and 8 symbols for the RS code mentioned above). Thus, more mistakes are expected in Stage 2, given that the same number of time slots are expended in Stage 2 for both cases. However, analysis indicates that for low SIR's, employing a high order of diversity combining in stage 3 is essential to get low false lock probabilities ($\sim 10^{-5}$) while keeping the probability of detection sufficiently high. This is also confirmed from simulations. Because of the smaller search space of the code based scheme, a large order of diversity combining is used if a constant number of time slots is expended in stage 3.

For example, employing 16 correlator fingers and using 4 time slots in stage 3, a diversity of 18 for the length 2 comma free code is obtained, because there are 9 unmasked symbols per time slot and it takes 2 symbols to search through 32 long code and offset combinations on 16 fingers. On the other hand using 4 time slots a diversity of 36 for the comma free code derived from the (8,3) RS code is obtained, whereas 4 time slots allows for no diversity combining in the NTT approach.

FIG. 4 depicts the state diagram for the 3 stage search. For the purpose of analysis, independent search stages are assumed, but correlated fading is taken into account within each search stage. For Rayleigh fading and for realistic Doppler frequencies the independence assumption does not hold; but the analysis is too complicated if the dependence between the stages are taken into account.

Under the assumption that the search stages are independent, the state diagram in FIG. 4 is a Markov chain. This corresponds to acquisition of a single received path. Since channel estimates are not available during acquisition, non-coherent detection is employed. Also, since symbols on perch 1 channel (except for the masked symbol) are data modulated, despreading is done by correlating over a single symbol interval. If more than one symbol is to be combined to form a decision variable, post detection diversity must be employed.

Stage 1 Search (State Si)

The first stage performs a correlation of the input with the code SC0 at half chip intervals (sliding window type correlation). Also, post-detection diversity combining may be employed; if $T_1$ slots are combined in stage 1, then, for each of the 5120 possible positions of SC0, denoted by u, $0 \leq u \leq 5119$, the test performed is:

$$\sum_{k=0}^{T_1-1} \left| \sum_{j=0}^{255} y_{2j+Tk+u} c_j \right|^2 > \tau_1 ?$$

where $y_j$ are the received (complex) samples, sampled at half chip intervals, with $y_0$ being the first sample received when stage 1 begins; $(c_0, c_2, \ldots, c_{255})$ is the short code SC0; and T is the interval between successive masked symbols, measured in half chips. All the 5120 hypotheses are tested in stage 1, and if any of them passes the test in the above equation, move to stage 2 of the search. If more than one hypothesis passes the test, the hypothesis that yields the maximum correlation value is picked, since 'the interest is in acquiring a single received path. The receiver may process multiple hypotheses that pass the test in parallel, potentially acquiring more than one path in one iteration of the search process. On the other hand if none of the hypotheses pass the test, it is a miss situation, remain in stage 1. The various statistics of interest in this stage are:

$p^1_d$: Probability that stage 1 picks the correct hypothesis
$p^1_m$: Probability that stage 1 misses (none of the hypotheses pass the test)
$p^1_f$: Probability that an incorrect hypothesis u is chosen Stage 2 (States S2a and S2b)

Stage 2 is entered both because of a correct detection in stage 1 (corresponding to state S2a in FIG. 4) and because of a false alarm in stage 1 (state S2b). In stage 2, for the original NTT proposal, the received signal y is correlated with the short codes SC1 to SCN, at the position at which the long code masked symbol is expected (from stage 1). The hypothesis chosen is the one that has a maximum correlation. This maximum correlation output is also compared to a threshold $\tau_2$, and a hit occurs only if it is exceeded. When a hit occurs, move on to stage 3, otherwise go back to stage 1. This reduces errors due to mistakes in stage 1. Again, a post detection diversity combination for $T_2$ time slots may be performed. To summarize, the test performed at this stage, for the original NTT scheme, is:

$$\max_{1 \leq r \leq N} \left( \sum_{k=0}^{T_2-1} \left| \sum_{j=0}^{255} y_{2j+Tk+u} c_j^r \right|^2 \right)_{>T_2},$$

where $y_1$ are the received (complex) samples, sampled at half chip intervals, with $y_u$ being the first sample received when stage 2 begins, coinciding with the marker position estimated in stage 1; if stage 1 chooses the correct hypothesis, is the correct masked symbol location, else it is an erroneous location. The sequences $(c_0^r, c_2^r, \ldots, c_{255}^r)$, $1 \leq r \leq N$, are the short Gold codes SC1 through SCN that encode the long code group, and T=5120 as before. The r that maximizes the test of the above equation is chosen as the group code, provided the threshold $\tau_2$ is exceeded, otherwise return to stage 1.

On the other hand, for the code based approach, the receiver calculates the correlation values:

$$D_r^i = \sum_{k=0}^{\frac{T_2}{n}-1} \left| \sum_{j=0}^{255} y_{j+T(nk+i-1)+u} c_j^r \right|^2,$$

where $(c_0^r, c_2^r, \ldots c_{255}^r)$, $1 \leq r \leq 17$, are the short Gold codes SC1 through SC17 that make up the alphabet of the length n group codes $C_1 C_2 \ldots C_n$; $C_i$ (with $1 \leq C_i \leq 17$) corresponds to one of the short codes SCi; and i (with $1 \leq i \leq n$) represents each of the n consecutive time slots. The group code and its received cyclic shift is estimated by computing the decision variable $\Lambda (\sqrt{\Lambda}$ corresponds to the Euclidean distance between the received n-tuple and each of the possible transmitted n-tuples):

$$\Lambda = \max_{\overline{C_1 C_2 \ldots C_n}} \left( \sum_{i=1}^{n} D \frac{i}{C_1} \right) > T_2 ?$$

where $\overline{C_1 C_2} \ldots \overline{C_n}$ are each of the transmitted group codes and their cyclic shifts.

The following are the statistics for stage 2:

$p_d^2$ : Probability that stage 2 picks the correct hypothesis, given stage 1 made a correct decision $p_m^2$: Probability that the stage 2 test did not succeed, given stage 1 made a correct decision $p_{e/c}^2$: Probability that stage 2 picks the wrong group code, given stage made a correct decision $p_{e/w}^2$: Probability that the stage 2 test erroneously succeeds for some
r (or $\overline{C_1 C_2} \ldots \overline{C_n}$), given stage 1 made an error $p_{c/w}^2$: Probability that the stage 2 test does not succeed for any r (or
$\overline{C_1 C_2} \ldots \overline{C_n}$), and return to stage 1, given stage 1 made an error.

Stage 3 (States S3a and S3b)

Stage 3 is entered both because of a correct decision in stage 1 (corresponding to state S3a in FIG. 4) and because of errors either in stage 1 or stage 2 (state S3b). At Stage 3 the long code group has already been determined. However, which long code within that group is being used, and its offset must be determined. Each of the long code candidates is searched by correlating the received signal with the corresponding long code and offset, using $T_3$ time slots (which may include post detection diversity combination), and finding out which hypothesis leads to maximum correlation output. The correlation operation has to be performed over symbol intervals corresponding to the unmasked portion of the perch 1 channel.

If $T_3$ time slots are used in stage 3, diversity combining of order $$d = 9 T_3 N n f/(16 L),$$

since there are 9 unmasked symbols per time slot can be utilized. With 16 fingers, the above equation implies a diversity of $T_3/4$ for the original NTT group code scheme, it implies a diversity of $9(T_3/2)$ for the length 2 comma free code example above, and a diversity of 9T, for the comma free code derived from the (8,3) RS code.

In addition, to minimize probability of false lock, the correlation value is tested against a threshold $\tau_3$. This is very important because stage 3 also acts as a verification stage, and is responsible for keeping the overall probability of false lock low—once this stage is passed, the delay locked loop is started, and the penalty for false lock is very high. Thus, the test performed at this stage is $$\max_{\substack{1 \leq w \leq L/N \\ 0 \leq s \leq (16/n)-1}} \left( \frac{1}{d} \sum_{k=0}^{d-1} \left| \sum_{j=0}^{255} y_{2j+u}^* c_{j+256k+2560s}^{G,w} \right|^2 \right) > T_3, ?$$

where y* are the complex conjugates of the received samples (the conjugation is needed because the long code is also complex); and $$(c_0^{G,w}, c_1^{G,w}, c_2^{G,w}, \ldots, c_{40959}^{G,w}), 1 \leq g \leq L/N$$

are the long codes in the group G (with $1 \leq G \leq N$) determined in stage 2, u is the masked symbol position determined in stage 1, and $0 \leq s \leq (16/n)-1$ are the 16/n possible long code offsets. If stage 1 chooses the correct hypothesis, then G is the correct group; if either of these are erroneous, then stage 3 is entered in error (corresponding to stage S3b in FIG. 4).

The above equation does not take into account the long code masked symbols on perch 1. The correlation process should skip these symbols, according to the masked symbol position estimated in stage 1.

The following are the statistics for stage 3:

$p_d^3$: Probability that stage 3 picks the correct hypothesis, given that stage 1 and 2 made correct decisions;

$p_m^3$: Probability that the stage 3 test does not succeed for any w and s, given that stage 1 and 2 made correct decisions;

$p_{e/c}^3$: Probability that stage 3 picks the wrong long code or offset, given that stage 1 and 2 made correct decisions;

$p_{e/w}^3$: Probability that the stage 3 test erroneously succeeds for some w and s, given that stage 1 or stage 2 made an error;

$p_{c/w}^3$: Probability that the stage 3 test does not succeed for any w and s, and (correctly) return to stage 1, given that stage 1 or stage 2 made an error.

At the end of the three stages either state "S5," corresponding to correct long code acquisition, or state "S4," corresponding to false lock is the current state.

Simulation Results

This section discusses simulation results comparing the original NTT group code scheme with the length 2 code and the (8,3) RS code based group code schemes. The parameters used for each simulation are listed; these are the values of $T_1$, $\tau_1$, $T_2$, $\tau_2$, $T_3$, and $\tau_3$. The thresholds are normalized with the variance of the total additive Gaussian noise at the receiver, which can be approximated to the total received signal energy $I_0$, because of the large spreading gain. The value of $I_0$ is estimated by averaging the envelope of the received signal over several symbol intervals. The analysis and simulations assume that perfect estimates of the noise power are known at the receiver.

The parameters $T_1$, $\tau_1$, $T_2$, $\tau_2$, $T_3$, and $\tau_3$ are obtained by analyzing the state diagram in FIG. 4. However, only the final parameter values and corresponding simulation results are stated. The parameters are optimized for the worst case conditions: lowest expected average per path SIR and the maximum expected Doppler frequency of 80 Hz. Lower Doppler frequencies lead to better performance.

Because of clock drift, there is a constraint of $T_1+T_2+T_3 \leq 48$ time slots. Also, even thought it is advantageous to use $T_1>1$, such a choice leads to large buffer requirements (10 to 15 KBytes of memory).

The current NTT spec assumes a total of 128 long codes (4 long code groups, with 32 codes per group) whereas the code based schemes support four times this number (512 long codes). Also, the simulations are performed at the level of abstraction of a despread symbol. What this means is, if the received signal carries the code being searched and if the received code is aligned to the locally generated replica, The random variable obtained from each despreading operation $$\sum_{j=0}^{255}$$

$y_1 c_1$ is abstracted to be $E_S+N$, where $E_S$ is the symbol energy (itself a random value picked from a Rayleigh distribution) and N is the total variance of additive Gaussian noise that represents thermal noise, inter and intra-cell interference, and cross correlation among different PN sequences, or their shifts. If the locally generated code ($c_j$) is note the same as the received code, or is not aligned to the received code, then the despread symbol $$\sum_{j=0}^{255}$$

$y_j c_j$ is taken to be a Gaussian random variable with variance N. The additive noise in both cases is assumed to be independent from symbol to symbol; however, correlation of the signal energy $E_S$ from symbol to symbol according to Rayleigh fading at a specified Doppler frequency is taken into account. Such a level of abstraction, while closely modeling the actual system, reduces simulation time significantly. Also, cross correlation between different PN codes, or correlation between a PN code and its random shifts, can be modeled as additive Gaussian noise to a good approximation.

The table below shows the final simulation results for Rayleigh fading with a Doppler frequency of 80 Hz, assuming 16 correlator fingers are used in stage 3, and for per path average SIR (which is defined as average $E_S/N$) of 0 dB and 1.5 dB. The SIR value is assumed to subsume signal degradation due to incorrect sampling phase, carrier frequency error, and $I_0$ estimation error; the indicated SIR is the received SIR minus all the degradations. These degradations will be the same for all the acquisition schemes compared. Also, in the NTT system the masked symbol energy is 3 dB lower than the unmasked symbol locations. The SIR values indicated in Table I are at the masked symbol locations, which is the average SIR seen by the first two stages; the SIR in stage 3 is 3 dB higher than the indicated SIR.

For the (8,3) RS code, performance is shown when using hard decision decoding at stage 2 of the acquisition process; as can be seen the code completely breaks down since hard decoding of block codes at low SIR results in high error probability. The value $P_d^2$ for the 0 dB case is 0.06, as obtained by simulation, compared to 0.22, which is the probability of detection for a single 17-ary symbol under Rayleigh fading, at 0 dB average SNR (M-ary orthogonal signalling under Rayleigh fading).

The average time for acquiring a single path is termed "$T_{acq}$," which is averaged over 1000 successful acquisitions. Only one path is assumed to be present at the receiver; more paths would result in lower $T_{acq}$. No false locks were observed for any of the schemes, which is expected because the parameters are designed for probability of false lock less than $10^{-5}$. Jake's fading model (see W. C. Jakes, "Microwave Mobile Communications," IEEE Press, 1974, hereby incorporated by reference) was used for the channel, and the simulations were done in Matlab on an Ultrasparc 2. Each run took approximately 8 hours.

| Simulation results, Rayleigh fading, 80 Hz Doppler | | | | | | | |
|---|---|---|---|---|---|---|---|
| | $T_1$ | $\tau_1$ | $T_2$ | $\tau_2$ | $T_3$ | $\tau_3$ | Avg. $T_{acq}$ (0 dB SIR) | Avg. $T_{acq}$ (1.5 dB SIR) |
| NTT original scheme (supports 128 long codes) | 1 | 10.25 | 3 | 3.7 | 3.2 | 4.13 | 1.7 sec | 0.55 sec |
| Length 2 comma free code (supports 512 long codes) | 1 | 10.25 | 8 | 2.9 | 8 | 2.39 | 0.94 sec | 0.29 sec |
| (8,3) RS code (soft decoded) supports 512 long codes | 1 | 10.25 | 8 | 2.8 | 8 | 1.90 | 0.7 sec | 0.20 sec |
| (8,3) RS code (hard decision decoding) | 1 | 10.25 | 8 | 2.8 | 8 | 1.90 | 5.4 sec | 1.1 sec |

The performance results shown above should be considered worst case. It is assumed that the additive noise is white Gaussian, so that the noise added to each despread symbol is independent. In reality the noise is colored by the cosine matched filtering done at the receiver front end; correlated noise is expected to improve acquisition performance. Also, in reality there will be more than one path at the receiver, leading to further performance improvement.

Conclusion

A method for reducing the long code search in WCDMA systems that results in lower acquisition time is disclosed. The method uses an error correcting block code sent over the second perch channel, and makes use of the comma free property of code words. Simulation results using a Rayleigh fading channel model show a factor of 2 to 3 improvement in acquisition time compared to the existing scheme employed in the NTT DoCoMo specification while supporting 4 times the number of long codes, keeping available hardware and the probability of false lock constant. The only extra processing required is for the maximum likelihood decoding of the group code during stage 2 of the acquisition process; this is estimated to consume less than 10 K DSP processor cycles for the (8,3) Reed Solomon code example. Thus, this method can be used for reducing time to acquire the received code at low SIRs, using simple hardware.

Alternative Embodiment: Mobile Station Acquisition

In an alternative class of embodiments, the disclosed innovations can also be adapted for uses in which base stations acquire mobile stations. Once acquisition has occurred, communications proceed as in a conventional wireless spread spectrum system.

Alternative Embodiment: Frequency-Hopping Systems

In an alternative class of embodiments, the disclosed innovations can also be adapted to frequency-hopping (FH), hybrid DS/FH, or DS/chirp spread spectrum systems.

Further details of the system context and of options for implementation may be found in Glover, DIGITAL COMMUNICATIONS (1998); S. Glisic and B. Vucetic, SPREAD SPECTRUM CDMA SYSTEMS FOR WIRELESS COMMUNICATIONS (1997); A. Viterbi, CDMA: PRINCIPLES OF SPREAD SPECTRUM COMMUNICATIONS (1995); K. Feher, WIRELESS DIGITAL COMMUNICATIONS, MODULATION AND SPREAD SPECTRUM APPLICATIONS (1995); R. Peterson et al., INTRODUCTION TO SPREAD SPECTRUM COMMUNICATIONS (1995); M. Simon et al., SPREAD SPECTRUM COMMUNICATIONS HANDBOOK (2.ED.1994); R. DIXON, SPREAD SPECTRUM SYSTEMS (3.ed. 1994); R. E. Blahut, THEORY AND PRACTICE OF ERROR CONTROL CODES, Addison-Wesley Publishing Company, 1983; D. Chase, A CLASS OF ALGORITHMS FOR DECODING BLOCK CODES USING CHANNEL MEASUREMENT INFORMATION, IEEE Transactions on Information Theory, Vol. IT-18, January 1972; A. G. Dabak, SYSTEM ENGINEERING FOR BUILDING WCDMA MOBILE RECEIVER, TI Technical Activity Report, January 1998; G. D. Forney, GENERALIZED MINIMUM DISTANCE DECODING, IEEE Transactions on Information Theory, Vol. IT-12, April 1966; W. C. Jakes, MICROWAVE MOBILE COMMUNICATIONS, IEEE Press, 1974; V. M. Jovanovic, and E. S. Sousa, ANALYSIS OF NON-COHERENT CORRELATION IN DS/BPSK SPREAD SPECTRUM ACQUISITION, IEEE Transactions on Communications, Vol. 43, No. 2/3/4, February 1995; K. R. Matis, and J. W. Modestino, REDUCED-STATE SOFT-DECISION TRELLIS DECODING OF LINEAR BLOCK CODES, IEEE Transactions on Information Theory, Vol. IT-8, January 1982; SPECIFICATIONS FOR MOBILE EQUIPMENT, NTT Mobile Communications Network, Inc., April 17, 1997; A. Papasskellariou, PILOT PN ACQUISITION FOR IS-95A, TI Technical Activity Report, July 1997; W. W. Peterson, and E. J. Weldon, ERROR CORRECTING CODES, Second Edition, The MIT Press, 1972, pp. 374–391; J. G. Proakis, DIGITAL COMMUNICATIONS, McGraw Hill Book Company, 1989; J. K. Wolf, EFFICIENT MAXIMUM LIKELIHOOD DECODING OF LINEAR BLOCK CODES USING A TRELLIS, IEEE Transactions on Information Theory, Vol. IT-24, January 1978; all of which are hereby incorporated by reference.

According to a disclosed class of innovative embodiments, there is provided: a method of spread spectrum communication, comprising the action of: transmitting a signal which at least intermittently includes both first data which has been spread by a first long code, and also second data which is transmitted intermittently, and has not been spread by said first long code; wherein multiple transmissions of said second data, in combination, provide at least partial identification of said first code.

According to another disclosed class of innovative embodiments, there is provided: a method of spread spectrum communication, comprising the actions of: transmitting a signal which includes first data which has been spread by a first long code, and which also includes, intermittently but not continuously, successive portions of a comma-free block code which provides at least partial identification of said first code, and a shared code which does not even partially identify said first long code; wherein said block code and said shared code are not spread by said first long code.

According to another disclosed class of innovative embodiments, there is provided: a method for operating a mobile station, comprising the steps of: detecting, when possible, an unspread code-identifying block code, in the transmission of a new base station with which communication is desired to be established; and deriving at least some information about the possible identity of a long code from said block of symbols in combination; and deriving at least some information about the phase of said long code from the phase of said block code.

According to another disclosed class of innovative embodiments, there is provided: a communications system comprising, in combination: a plurality of base stations executing a method of spread spectrum communication, comprising the action of: transmitting a signal which at least intermittently includes both first data which has been spread by a first long code, and also second data which is transmitted intermittently, and has not been spread by said first long code; and a plurality of receivers executing a method for operating a mobile station, comprising the steps of: detecting, when possible, an unspread code-identifying block code, in the transmission of a new base station with which communication is desired to be established; and deriving at least some information about the possible identity of a long code from said block of symbols in combination; and deriving at least some information about the phase of said long code from the phase of said block code; wherein said second data successively defines portions of a block code which provides at least partial identification of said first code.

According to another disclosed class of innovative embodiments, there is provided: a system of spread spectrum communication, comprising: a base station which transmits a signal, at least intermit- tently, comprising: first data which has been spread by a first long code; second data which is transmitted intermittently, and has not been spread by said first long code; and a block code which provides at least partial identification of said first code and is defined, at least in part by said second data; and a receiver which receives said signal and said block code.

According to another disclosed class of innovative embodiments, there is provided: a system of spread spectrum communication, comprising: a base station which transmits a signal, comprising: first data which has been spread by a first long code; successive portions of a comma-free block code, transmitted intermittently but not continuously, which provide at least partial identification of said first code, which is not spread by said first long code; and a shared code which does not even partially identify said first long code and which is not spread by said first long code; and a receiver which receives said signal.

According to another disclosed class of innovative embodiments, there is provided: a system of spread spectrum communication, comprising: a base station; and a receiver which detects, when possible, an unspread code-identifying block code, in the transmission of a said base station with which communication is desired to be established; and which derives at least some information about the possible identity of a long code transmitted from said base station from said block of symbols in combination; and derives at least some information about the phase of said long code from the phase of said block code.

Modifications and Variations

As will be recognized by those skilled in the art, the innovative concepts described in the present application can be modified and varied over a tremendous range of applications, and accordingly the scope of patented subject matter is not limited by any of the specific exemplary teachings given, but is only defined by the issued claims.

For example, the disclosed inventions are not at all limited to analogues of the DoCoMo system, but can be used with systems which include other implementation details.

For another example, the disclosed inventions are not strictly limited to DS-SS systems, but can be used in hybrid systems which also include some allocation by frequency or by frequency-hopping pattern.

For another example, the Reed-Solomon codes used in the presently preferred embodiment can of course be replaced by other codes, preferably comma-free block codes. Such codes can include BCH, Hamming codes, or other more powerful error-correcting codes. The length of such codes should preferably evenly divide into the length of the long codes. Alternatively, the length of the code words could be multiples of the length of the long codes.

For another example, the Gold codes used in the presently preferred embodiment can be replaced by other codes, e.g. Walsh codes.

For another example, the shared code (SC0, in the presently preferred embodiment) does not need to be totally global. (The correlation burden to find SC0 is relatively light, especially considering how much correlation time is saved by the disclosed inventions.) Instead, a small set of reserved shared codes (e.g. 4 or 7) could be used instead of SC0 on the first perch channel, together with block coding as described above on a second perch channel. This would provide a small amount of identification information in the first perch channel, together with the more extensive identification and phase information provided by the block code on the second perch channel.

For another example, if the set of block codes is large enough to uniquely identify the long code, it will not be necessary to do a sliding correlator search if other methods can be used to get the phase offset.

In another alternative embodiment, where the set of comma-free block codes (within the constraints of acceptable minimum distance) is more than twice the number of stations, multiple block codes can be assigned to each base station. This permits the station to be uniquely identified within less time than is required for one repetition of the long code word. For example, within the context of the preferred embodiment-described above, TWO comma-free 8-symbol codes can be assigned to each station (transmitted ABABAB), so that as soon as the mobile recognizes the block code there is no phase ambiguity. This allows for the use of shorter block codes as well.

In another alternative embodiment, if larger acquisition time can be tolerated, then the power allocated in the perch channel can be reduced. This reduces interference, and increases system capacity. If fast hardware (e.g. a correlator coprocessor) is available to the receiver, this code based acquisition method still has the advantage of being able to employ the hardware for searching multiple paths and base stations in parallel.

In another alternative embodiment, a very large number of long codes can be supported. This large code base is useful for "picocell" architectures that employ a large number of small base stations.

For another example, results for the code based approach can be improved further in the following manners: using a larger number of long code groups to further reduce the search needed in stage 3; using longer error correcting codes to improve performance, and employing efficient decoding techniques for decoding the block code; employing techniques allowing diversity combining in stage 1.

For another example, since we are allowed $T_1+T_2+T_3$, but we are using only 17 time slots for the results shown here, we can further improve performance by employing diversity combining in stage 2. The NTT scheme employs 36 slots, which is more than twice the number of slots used in the code based approach. However, the code based scheme performs more efficiently.

For another example, the disclosed innovations can be incorporated into a soft handoff scheme. Such a scheme, while more computationally intense, would allow acquisitions of a mobile unit by two base stations.

For another example, as will be obvious to those of ordinary skill in the art, other station topologies can replace, be added to, or substituted into, the specific station topologies shown.

For another example, within the constraints well-known to those of ordinary skill, codes with differing properties may be substituted for those described.

What is claimed is:

1. A method of spread spectrum communication, comprising the steps of:

transmitting, on a first channel, a signal comprising a sequence of symbols that have been spread by a first long code, and also comprising a long code marker symbol not been spread by the first long code and appearing periodically within the signal;

transmitting, on a second channel, a signal comprising a repeated sequence of short code symbols, each short code symbol transmitted synchronously with one of the long code marker symbols on the first channel, and each short code symbol within the sequence differing from other short code symbols in the sequence in such a manner that the sequence has a unique cyclical shift, wherein the sequence of short code symbols identifies a group of long codes containing the first long code.

2. The method of claim 1 wherein the sequence of short code symbols is selected from a set of comma free error correcting codes.

3. The method of claim 1 wherein the sequence of short code symbols is selected from a set of comma free codes.

4. The method of claim 1 wherein the sequence of short code symbols is selected from a set of Reed-Solomon codes.

5. The method of claim 1 wherein a repeated sequence of the long code marker symbols corresponds to the length of the first long code so that the offset of the first long code may be derived from the short code symbols.

6. The method of claim 1 wherein the first long code contains a shared code.

7. The method of claim 1 wherein the first long code is a linear code with a maximum minimum distance.

8. The method of claim 1 wherein the first long code is an (n,k) linear code with a minimum distance of n−k+1.

9. A method for operating a mobile station, comprising the steps of:

detecting a plurality of unspread long code marker symbols periodically transmitted by a base station, with which communication is desired to be established, on a first channel among symbols that are scrambled according to a long code assigned to the base station;

detecting, on a second channel, a sequence of short code symbols, each short code symbol transmitted by the base station synchronously with the long code marker symbol, where each short code symbol in the sequence differing from other short code symbols in the sequence so that the sequence has a unique cyclical shift;

deriving the identity of a subset of long codes to which said long belongs from the combination of the detected sequence of short code symbols; and deriving frame timing of the long code from the position of the detected short code symbols within the sequence.

10. The method of claim 9 wherein the sequence of short code symbols is selected from a set of comma free error correcting codes.

11. The method of claim 9 wherein said long code is a linear code with a maximum minimum distance.

12. A system of spread spectrum communication, comprising:

a base station for transmitting a signal, at least intermittently, the signal comprising:
  on a first channel, first data that have been spread by a first long code;
  also on the first channel, second data that are transmitted intermittently, and have not been spread by said first long code; and
  on a second channel, a block code comprised of a sequence of block code symbols transmitted synchronously with the second data, each of the symbols differing from others of the block code symbols in the sequence in such a manner that the sequence of block code symbols has a unique cyclical shift, and that provides at least partial identification of said first 10 ng code and is defined, at least in part by said second data; and a receiver for receiving said signal and for identifying the first long code from said block code.

13. The system of claim 12 wherein the sequence of short code symbols is selected from a set of comma free codes.

14. The system of claim 12 wherein a repeated sequence of the second data corresponds to the length of the first long code so that the offset of the first long code may be derived from the block code symbols.

15. The system of claim 12 wherein the first long code is a linear code with a maximum minimum distance.

16. A system of spread spectrum communication, comprising:

a base station; and a receiver for detecting a plurality of unspread long code marker symbols periodically transmitted by said base station, with which communication is desired to be established, on a first channel among symbols that are scrambled according to a long code assigned to the base station; for detecting, on a second channel, a sequence of short code symbols, each short code symbol transmitted by the base station synchronously with the long code marker symbol, where each short code symbol in the sequence differing from other short code symbols in the sequence so that the sequence has a unique cyclical shift; and for deriving the identity of a subset of long codes to which said long code belongs from the combination of the detected sequence of short code symbols; and for deriving frame timing of the long code from the position of the detected short code symbols within the sequence.

17. The system of claim 16 wherein the sequence of short code symbols is selected from a set of comma free error correcting codes.

* * * * *